June 7, 1932.  I. I. NELSON  1,861,506
VALVE FOR HOT WATER SYSTEMS
Filed March 29, 1930
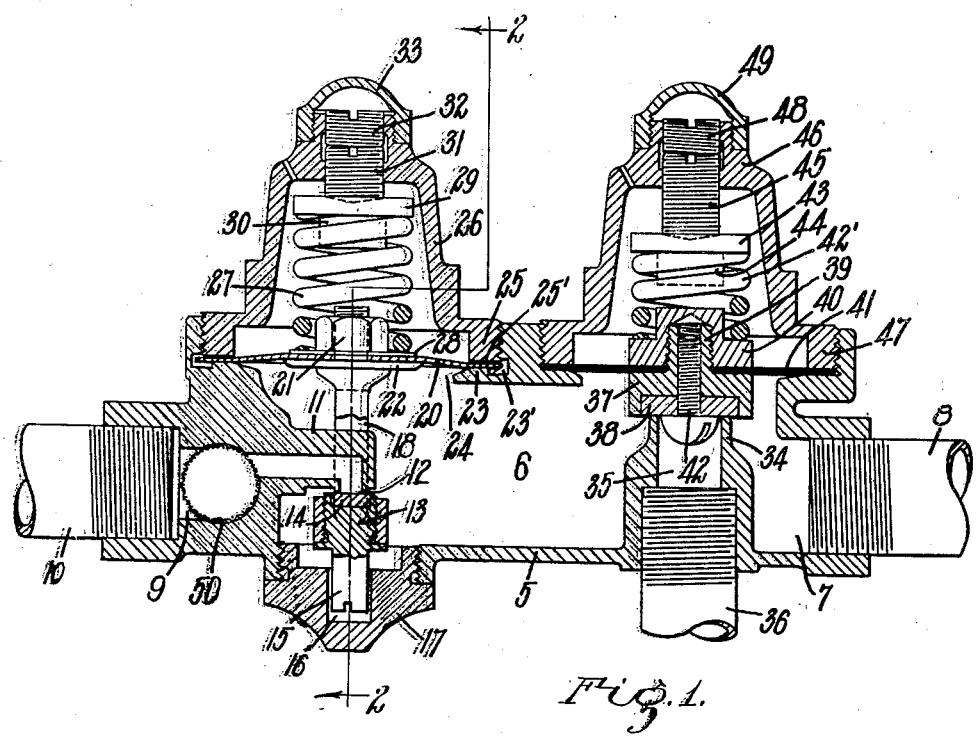
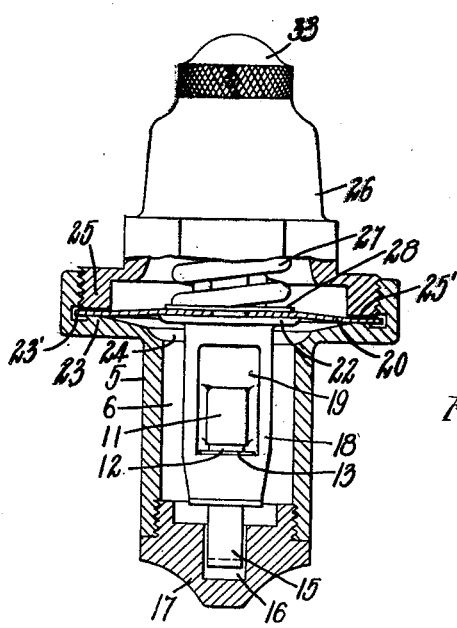
Inventor:
Ira I. Nelson,
by Charles H. Gooding
Atty.

Patented June 7, 1932

1,861,506

UNITED STATES PATENT OFFICE

IRA I. NELSON, OF BOSTON, MASSACHUSETTS

VALVE FOR HOT WATER SYSTEMS

Application filed March 29, 1930. Serial No. 439,962.

This invention relates to an improved valve for use in controlling the pressure in hot water heating systems. The valve of this invention as a whole embodies a reducing valve for enabling water under pressure to be admitted to the system when the pressure in the hot water heating system becomes less than a predetermined or normal pressure, and the valve of this invention also embodies therein a relief valve which enables the water in the system to flow out of the system when the pressure in the hot water heating system exceeds the same predetermined or normal pressure.

The invention consists in the combination and arrangement of parts set forth in the following specification and particularly pointed out in the claims.

Referring to the drawing:

Fig. 1 is a vertical longitudinal sectional elevation of the valve of this invention.

Fig. 2 is a sectional elevation taken on line 2—2 of Fig. 1.

Like numerals refer to like parts in the several views of the drawing.

In the drawing, 5 is a casing of the valve of this invention, the said casing being provided with a chamber 6 which is provided at one end thereof with an outlet passage 7 and outlet pipe 8, and at the opposite end said casing is provided with an inlet passage 9 and inlet pipe 10. An arm 11 projects into the casing chamber 6 from the end of said casing adjacent to the inlet passage, and said arm at its inner end projects downwardly terminating in a valve seat 12. The inlet passage passes through the arm 11 and opens downwardly and outwardly from said arm into the casing chamber 6. An inlet valve member 13, provided in its upper end with a disc 14 forming a part thereof, bears against the valve seat 12. Said inlet valve member 13 has a guide stem 15 projecting downwardly therefrom and into a recess 16 provided in a cap 17 fast to the bottom of the casing 5, the recess 16 being in alignment with said guide stem and serving as a guideway therefor.

An inlet valve stem 18 has screw-threaded engagement at its lower end with the valve member 13 and projects upwardly therefrom, being bifurcated at 19 and straddling the inner end of the arm 11. The inlet valve stem 18 extends upwardly from the inlet valve member 13 and has a diaphragm 20 fastened to its upper end by a nut 21 and flange 22, the diaphragm 20 being clamped against the flange 22 by the nut 21.

The casing 5 is provided with an annular flange 23 which surrounds an opening 24 in the top of the casing 5 and the diaphragm 20 is clamped to the flange 23 by a screw-threaded flange 25 which has screw-threaded engagement with the casing 5, the outer diameter of the diaphragm 20 being of greater diameter than that of the flange 25 so that the outer portion of said diaphragm projects beyond the flange 25 and into an annular recess 23' provided in the casing 5. The flange 25 forms a portion of a primary cap 26 and within said primary cap is a spiral spring 27 which encircles the nut 21 and the upper end of the inlet valve stem 18. Said spring bears at its lower end against a washer 28 which bears against the diaphragm 20 and its upper end bears against a disc 29 provided with a downwardly extending stem 30, the stem 30 projecting into the interior of the spring 27. More or less tension is applied to the spring 27, as may be desired, by means of a set screw 31 having a right-hand screw thread thereon and having screw-threaded engagement with the upper end of the primary cap 26. Another set screw 32 having a left-hand screw thread thereon also has screw-threaded engagement with the upper end of the primary cap 26 and bears against the set screw 31 forming a lock nut therefor. A secondary cap 33 has screw-threaded engagement with the upper end of the primary cap 26 and covers the set screw 32.

In the end adjacent the outlet passage 7 there is provided a relief valve seat 34 which projects upwardly from the bottom of the casing 5 and is provided with a relief valve outlet passage 35 which extends downwardly through the seat 34 and communicates with a relief valve outlet pipe 36.

A relief valve member 37 is provided with a washer 38 which forms a part thereof and normally rests against the upper end of the relief valve seat 34. The relief valve member 37 has a screw-threaded stem 39 projecting upwardly therefrom into a clamp member 40. A diaphragm 41 is clamped between the clamping member 40 and the relief valve member 37. The washer 38 is fastened to the relief valve member 37 by a screw 42.

A spring 42' rests at its lower end upon the clamping member 40, which forms in effect a part of the relief valve member, and the upper end of the spring 42' bears against a disc 43 which has a downwardly projecting stem 44 thereon, said stem 44 projecting into the interior of the spring 42'.

A set screw 45 has screw-threaded engagement with a primary cap 46, the lower end of said cap being provided with a screw-threaded flange 47 having screw-threaded engagement with the top portion of the casing 5. Another set screw 48 has screw-threaded engagement with the upper end of the cap 46 and bears against the set screw 45. The set screw 48 has a left-hand screw thread on its periphery and the set screw 45 has a right-hand screw thread upon its periphery. The set screw 48 thus forms a locking means for the set screw 45. A secondary cap 49 has screw-threaded engagement with the upper end of the primary cap 46 and covers the upper end of said cap and also the upper end of the set screw 48.

The different parts of the foregoing valve are illustrated in the drawings in their relative positions when the pressure in the hot water heating system is normal. If the pressure in the system descends below normal, then the inlet valve member 13 is opened by the pressure of the spring 27 on the diaphragm 20, which pushes the valve stem 18 downwardly carrying with it the inlet valve member 13 and opening the passage 9 to the chamber 6. Water from a source of water under pressure then enters the chamber 6 through the inlet passage 9 until the pressure in the system rises to normal, whereupon the diaphragm 20 will be pushed upwardly by the pressure of the water overcoming the tension of the spring 27 and closing the inlet valve member 13 through the medium of the valve stem 18.

When the pressure of the water in the heating system rises above normal then the relief valve member 37 is pushed upwardly by the pressure of the water against the diaphragm 41, which overcomes the tension of the spring 42' and opens the inlet valve to allow water to pass downwardly through the passage 35 and outlet pipe 36. When the pressure of the water in the system is reduced to normal by this means, the spring 42' pushes the inlet valve member downwardly until it seats against the inlet valve seat 34 and the water in the system is thereby prevented from further outflow through the passage 35 and outlet pipe 36.

In the inlet valve passage 9 there is positioned a strainer 50 to prevent any sediment or other matter from entering the casing chamber 6 through the inlet passage 9 and thus preventing such sediment or foreign matter from entering the water heating system through the outlet pipe 8 of the regulating valve.

The object of making the diameter of the screw-threaded flange 25 on the cap 26 less than the outside diameter of the diaphragm 20 is to prevent the diaphragm from being torn when it is clamped to the flange 23 by the flange 25, it being evident that there is less tendency to tear the diaphragm, which is made of rubber, when the outside of the flange is spaced apart from the outside of the diaphragm than if the flange 25 were of the same diameter as the diaphragm. To still further guard against tearing the rubber diaphragm, a metal washer 25' is interposed between the flange 25 and the diaphragm 20.

I claim:

1. A valve having, in combination, a casing provided with a chamber and with an outlet passage at one end thereof and an inlet passage at the other end thereof adapted to be connected to a source of water under pressure and terminating in an inlet valve seat within said chamber, an inlet valve member adapted to engage said inlet valve seat and close said inlet passage, an inlet valve stem extending upwardly from said inlet valve member, a diaphragm fast to the upper end of said inlet valve stem and acting as a closure to an opening out of said chamber, a cap having screw-threaded engagement with said casing and constituting a clamp whereby said diaphragm may be clamped to said casing, a spring positioned in said cap and bearing against said diaphragm, a disc positioned on the upper end of said spring, a pressure-adjusting screw having screw-threaded engagement with the upper end of said cap and bearing against said disc, and another screw having screw-threaded engagement with said cap and bearing against said first-named screw, one of said screws having a right-handed thread and the other of said screws having a left-handed thread, whereby when the pressure of water in said chamber descends below a predetermined amount said inlet valve will be opened by said spring and water enter said chamber until said pressure of predetermined amount is restored whereupon said inlet valve will be closed by said diaphragm.

2. A valve having, in combination, a casing provided with a chamber and with an outlet passage at one end thereof and an inlet passage at the other end thereof adapted to be connected to a source of water under pressure and terminating in an inlet valve seat within said chamber, an inlet valve member adapted to engage said inlet valve seat and close said inlet passage, an inlet valve stem extending upwardly from said inlet valve member, a diaphragm fast to the upper end of said inlet valve stem and acting as a closure to an opening out of said chamber, a cap having screw-threaded engagement with said casing and constituting a clamp whereby said diaphragm may be clamped to said casing, a spring positioned in said cap and bearing against said diaphragm, a screw having screw-threaded engagement with said cap adapted to regulate the tension of said spring, and another screw having screw-threaded engagement with the upper end of said cap and bearing against said first-named screw, one of said screws having a right-handed thread and the other screw having a left-handed thread, whereby when the pressure of water in said chamber descends below a predetermined amount said inlet valve will be opened by said spring and water enter said chamber until said pressure of predetermined amount is restored, whereupon said inlet valve will be closed by said diaphragm.

3. A valve having, in combination, a casing provided with a chamber and with an outlet passage at one end thereof and an inlet passage at the other end thereof adapted to be connected to a source of water under pressure and terminating in an inlet valve seat within said chamber, an inlet valve member adapted to engage said inlet valve seat and close said inlet passage, an inlet valve stem extending upwardly from said inlet valve member, a diaphragm fast to the upper end of said inlet valve stem and acting as a closure to an opening out of said chamber, a primary cap having screw-threaded engagement with said casing and constituting a clamp whereby said diaphragm may be clamped to said casing, a spring positioned in said cap and bearing against said diaphragm, a disc positioned on the upper end of said spring, a pressure-adjusting screw having screw-threaded engagement with the upper end of said cap and bearing against said disc, and another screw having screw-threaded engagement with said cap and bearing against said first-named screw, one of said screws having a right-handed thread and the other of said screws having a left-handed thread, whereby when the pressure of water in said chamber descends below a predetermined amount said inlet valve will be opened by said spring and water enter said chamber until said pressure of predetermined amount is restored, whereupon said inlet valve will be closed by said diaphragm, and a secondary cap having screw-threaded engagement with the upper end of said primary cap and closing a hole therein in alignment with said screw.

4. A valve having, in combination, a casing provided with a chamber and with an outlet passage at one end thereof and an inlet passage at the other end thereof adapted to be connected to a source of water under pressure and terminating in an inlet valve seat within said chamber, an inlet valve member adapted to engage said inlet valve seat and close said inlet passage, an inlet valve stem extending upwardly from said inlet valve member, a diaphragm positioned in a recess in the top of said casing and acting as a closure to an opening out of the top of said casing, a flange surrounding said opening, said diaphragm being fastened to said valve stem, a cap having screw-threaded engagement with said casing and constituting a clamp whereby said diaphragm may be clamped to said flange, the diameter of said diaphragm being greater than the screw-threaded portion of said cap, and a spring positioned in said cap and bearing against said diaphragm, whereby when the pressure of water in said chamber descends below a predetermined amount said inlet valve will be opened by said spring and water enter said chamber until said pressure of predetermined amount is restored, whereupon said inlet valve will be closed by said diaphragm.

In testimony whereof I have hereunto set my hand.

IRA I. NELSON.